(12) United States Patent
Zhang et al.

(10) Patent No.: US 8,631,737 B2
(45) Date of Patent: *Jan. 21, 2014

(54) MANUAL BREAD-TOASTER, WITH LID

(75) Inventors: George Mohan Zhang, Guangdong (CN); Bei Zhang, Guangdong (CN); Huajin Chen, Guangdong (CN)

(73) Assignee: Crastal Technology (Shenzhen) Co., Ltd., Shenzhen, Guangdong (CN)

(*) Notice: Subject to any disclaimer, the term of this patent is extended or adjusted under 35 U.S.C. 154(b) by 325 days.

This patent is subject to a terminal disclaimer.

(21) Appl. No.: 12/737,717

(22) PCT Filed: Mar. 26, 2009

(86) PCT No.: PCT/CN2009/071015
§ 371 (c)(1),
(2), (4) Date: Feb. 7, 2011

(87) PCT Pub. No.: WO2010/015154
PCT Pub. Date: Feb. 11, 2010

(65) Prior Publication Data
US 2011/0132202 A1  Jun. 9, 2011

(30) Foreign Application Priority Data
Aug. 7, 2008 (CN) .......................... 2008 1 0142258

(51) Int. Cl.
*A47J 37/08* (2006.01)

(52) U.S. Cl.
USPC .............................................. 99/332; 99/385

(58) Field of Classification Search
USPC ............................. 99/332, 339, 385–402, 427
See application file for complete search history.

(56) References Cited

U.S. PATENT DOCUMENTS

| | | | | |
|---|---|---|---|---|
| 1,997,192 A * | 4/1935 | Kasamis | .......................... | 99/391 |
| 2,053,935 A * | 9/1936 | Austin | .......................... | 219/385 |
| 2,194,859 A * | 3/1940 | Malmquist et al. | ............. | 99/328 |
| 2,659,295 A * | 11/1953 | Soccoli | ............................ | 99/339 |
| 3,007,393 A * | 11/1961 | Le Doux | ............................ | 99/427 |
| 3,298,300 A * | 1/1967 | Grebow et al. | .................. | 99/337 |
| 3,760,713 A * | 9/1973 | Sato | ............................... | 99/391 |
| 3,789,749 A * | 2/1974 | Paaskesen | ....................... | 99/391 |
| 4,254,695 A * | 3/1981 | Landry | ............................ | 99/334 |
| 4,487,115 A * | 12/1984 | Su | .................................... | 99/327 |
| 4,901,631 A * | 2/1990 | Russell et al. | ................... | 99/339 |
| 5,423,246 A * | 6/1995 | McNair et al. | ................... | 99/334 |
| 6,675,700 B2 * | 1/2004 | Hong | ........................... | 99/329 P |
| 6,829,983 B2 * | 12/2004 | Arnedo et al. | ................... | 99/327 |
| 6,973,871 B1 * | 12/2005 | Chuang et al. | .................. | 99/327 |
| 2002/0190053 A1 * | 12/2002 | Garber et al. | ................. | 219/413 |

* cited by examiner

*Primary Examiner* — Henry Yuen
*Assistant Examiner* — John Wasaff
(74) *Attorney, Agent, or Firm* — Raymond Y. Chan; David and Raymond Patent Firm

(57) ABSTRACT

The bread toaster includes a toaster frame defining at least one toaster slot for selectively receiving the bread slice, a heating device, and a lid arrangement. The lid arrangement includes a front and a rear sliding member, a plurality of sliding guiders, and at least one toaster lid. The toaster lid is coupled with the front and the rear sliding members in such a manner that the toaster lid is arranged to move between a closed position and an opened position, wherein in the closed position, the toaster lid is moved by the front and the rear sliding members to close the toaster slot, wherein in the opened position, the toaster lid is moved by the front and the rear sliding members to expose the toaster slot to an exterior of the toaster frame.

4 Claims, 7 Drawing Sheets

MANUAL BREAD-TOASTER, WITH LID

BACKGROUND OF THE PRESENT INVENTION

1. Field of Invention

The present invention relates to a toaster, and more particularly to a bread toaster comprising a manual driven lid arrangement.

2. Description of Related Arts

A conventional bread toaster usually comprises a toaster casing, a toaster base, an electronic timer, and a toasting rack which is movably mounted in the toaster casing and defines two toasting slots, a handle coupled with the toasting rack, and a plurality of heating elements received in the toaster casing. Its primary function is to toast at least one bread slice for a predetermined period of time preset by the timer. Conventionally, the bread toaster has a plurality of elongated openings formed on a top side of the toaster casing and aligned with the two toasting slots respectively. The operation of the convention bread toaster is as follows: a user may connect the bread toaster to an external electricity source and put two bread slices into the two toasting slots through the elongated openings respectively. When the bread slices are received in the toasting slots, the user may downwardly depress the handle so as to move the toasting rack downwardly. The heating element is then activated for a time period determined by the electronic timer so as to toast the bread slices for the corresponding period of time. The major disadvantage of this type of conventional bread toaster is that the elongated openings face upwardly which make dusts and dirt enter the toasting slots very easily. Moreover, since the elongated openings are the major channels communicating the toasting slots and an exterior of the bread toaster, when the toaster is operating, heat generated in the toasting slots will dissipate very rapidly through the elongated openings, making the bread toaster to be very inefficient. One further problem is that due to the existence of the elongated openings, heat distribution along a vertical direction of the toasting slots is very uneven, making uneven toasting performance on the part of the bread toaster.

SUMMARY OF THE PRESENT INVENTION

The invention is advantageous in that it provides a bread toaster comprising a manual driven lid arrangement, which allows a user of the present invention to select if he or she likes to toast a bread slice when a lid member is covering the elongated slots. This toasting mechanism facilitates even and efficient toasting performance on the part of the bread toaster, helps to keep the toasting slots clean, and shortens toasting time.

In order to accomplish the above objects, the bread toaster is described as follows:

The present invention provides a bread toaster for toasting at least one bread slice, comprising a toaster frame defining at least one toaster slot for selectively receiving the bread slice, a heating device received in the toaster frame for toasting the bread slice when the bread slice is received in the toaster slot, and a lid arrangement comprising a front and a rear sliding member, a plurality of sliding guiders, and a toaster lid. The front and a rear sliding member are movably mounted on the toaster frame. The sliding guiders are mounted on the toaster frame for guiding the front and the rear sliding member to slide along the toaster frame respectively. The toaster lid is coupled with the front and the rear sliding members in such a manner that the toaster lid is arranged to move between a closed position and an opened position, wherein in the closed position, the toaster lid is moved by the front and the rear sliding members to close the toaster slot, wherein in the opened position, the toaster lid is moved by the front and the rear sliding members to expose the toaster slot to an exterior of the toaster frame.

The lid arrangement further comprises a rear electromagnetic frame, a rear biasing member, a first and a second rear driving member, a rear electromagnetic member supported by the rear electromagnetic frame, a rear actuation handle extended from the rear sliding member, a rear electromagnetic coil mounted on a rear side of the toaster frame and is aligned with the rear electromagnetic member, and a rear switch mounted on the toaster frame and is positioned below and aligned with the rear biasing member.

The lid arrangement further comprises a rear hanger frame, a rear biasing member, a first and a second rear driving member connected with the rear sliding member, and a rear actuation handle, a rear electromagnetic coil, a rear electromagnetic member coupled with the rear electromagnetic coil, and a rear switch, wherein the rear electromagnetic member has a rear hanging member positioned below the rear hanger frame, whereas the rear switch is mounted on the toaster frame and is positioned below and aligned with the rear biasing member.

Each of the sliding guiders is embodied as a guiding shaft, wherein the lid arrangement further comprises a first and a second rear guiding frame having inwardly bent end portions, wherein each of the first and the second rear driving member has a corresponding upper end portion arranged to couple with the corresponding inwardly bent end portion of the first and the second rear guiding frame respectively.

The lid arrangement comprises one to four sliding guiders.

Furthermore, the heating device comprises a control circuitry which comprises a timer sub-circuitry and means for controlling an operation of the lid arrangement, wherein the controlling means and the timer sub-circuitry are electrically connected with the lid arrangement for controlling an operation thereof.

The controlling means comprises a power source, a first diode having a positive terminal connected to an output terminal of the timer circuitry, a first transistor, a first switch, and a second resistor, wherein a negative terminal of the first diode is connected to the first switch and to a base of the first transistor through the second resistor, wherein the controlling means further comprises a second diode and a first inducting device, wherein the first switch is also electrically connected to an emitter of the first transistor, and a collector of the first transistor is electrically connected to a positive terminal of the second diode and the first inducting device, which is also electrically connected to a negative terminal of the second diode and the power source of the control circuitry.

The controlling means further comprises a second switch, a third resistor, a fourth resistor, a second capacitor, a third diode having a positive terminal electrically connected to the output terminal of the timer circuitry, the positive terminal of the first diode, and the second switch, and a negative terminal electrically connected to the third resistor, the fourth resistor and a positive terminal of the second capacitor, wherein the controlling means further comprises a second transistor having a base electrically connected to the fourth resistor, wherein a negative terminal of the second capacitor is electrically connected to the emitter of the second transistor, wherein the controlling means further comprises a second inducting device, a fourth diode, wherein a collector of the second transistor is electrically connected to the second inducting device and a positive terminal of the fourth diode, a third capacitor, and a fifth diode, wherein a positive terminal of the fourth diode is electrically connected to the positive terminal of the third capacitor and the second inducting device, wherein a negative terminal of the fourth diode is electrically connected with a negative terminal of the fifth diode, and a negative terminal of the third capacitor is electrically connected to the ground, while a positive terminal of the fifth diode is electrically connected to the power source.

Alternatively, the controlling means further comprises a first diode, wherein a positive terminal of the third diode is electrically connected to an output terminal of the timer circuitry, a positive terminal of the first diode and the first switch, wherein a negative terminal of the third diode is electrically connected to the third resistor, the fourth resistor, and a positive terminal of the second capacitor, wherein the second switch is connected to the ground, wherein the fourth resistor is electrically connected to a base of the second transistor, wherein a negative terminal of the second capacitor is electrically connected to an emitter of the second transistor, whereas a collector of the second transistor is electrically connected to a negative terminal of the third capacitor, the second inducting device and a positive terminal of the fourth diode, wherein a positive terminal of the third capacitor, the second inducting device and a negative terminal of the fourth diode are connected to a negative terminal of the fifth diode, whereas a positive terminal of the fifth diode is electrically connected to a power source.

The first diode utilizes 4148, 4001, 4005 or 4007 type diode, while the second resistor has a resistance between 1KΩ to 3KΩ, wherein the first switch is A06-A-4.0 type or A06-A-5.0 type, wherein the first transistor is 8050 type or 9014 type, while the second diode is 4001, 4005 or 4007 type, wherein the first inducting device has a value of 60Ω/800 coils to 250Ω/3000 coils, wherein the third diode is 4148, 4001, 4005 or 4007 type, wherein the second switch utilizes A06-A-4.0 or A06-A-5.0 type, while the third resistor has a resistance of 1KΩ to 3KΩ, and the fourth resistor has a resistance of 0.5Ω to 3KΩ, wherein the second capacitor has a range of 47 UF/16V to 470 UF/16V, while the second transistor Q2 utilizes 8050 or 9014 type, and the third capacitor has a range of 470 UF/16V to 2000 UF/16V or 470 UF/25V to 2000 UF/25V, wherein the second inducting device has a value of 60Ω/800 coils to 250Ω/3000 coils, wherein the fourth diode and the fifth diode utilize 4001, 4005 or 4007 type.

As compared to conventional bread toasters, the present invention allows toasting of bread slice with or without the lid members. Moreover, when the toaster finishing toasting the bread slices, the lid members will open first and then the bread slices are pushed upwardly for allowing the user to retrieve the bread slices. These enable the bread slices to be toasted evenly while keeping the entire toasting process clean and reliable. The structure of the present invention is very simple for minimizing the manufacturing cost thereof.

DETAILED DESCRIPTION OF THE PREFERRED EMBODIMENT

Figure 1:
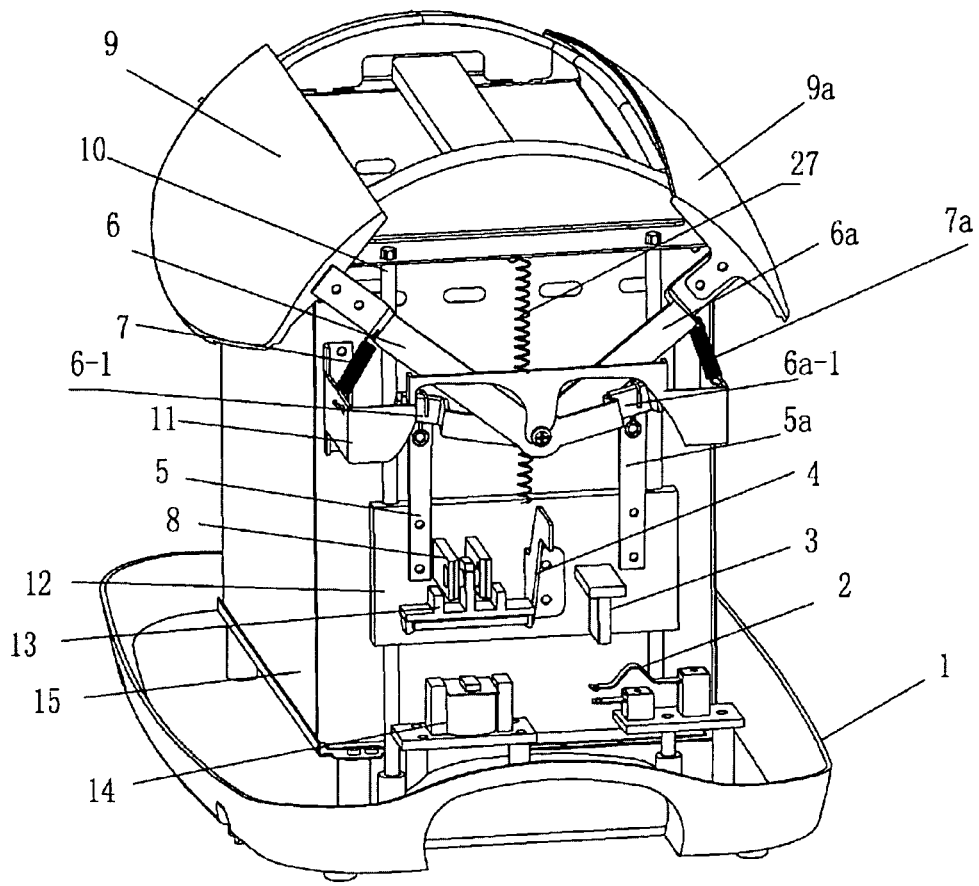
FIG. 1 is a perspective view of a bread toaster with a lid arrangement according to a first preferred embodiment of the present invention.

The preferred embodiment of the present invention will be described below with the aid of the drawings.

As shown in the drawings, a bread toaster according to a preferred embodiment of the present invention is illustrated, in which the bread toaster comprises a toaster frame 15, a toaster base 1, a heating device and a lid arrangement. The lid arrangement comprises a front sliding member 21 and a rear sliding member 12, a plurality of front sliding guider 10 and rear sliding guiders 10 slidably coupled with the front and the rear sliding member 21, 12, a toaster lid, and a front supporting frame 11a, and a rear supporting frame 11. The front and the rear sliding member 21, 12 are movably mounted on the toaster frame 15. The sliding guiders 10 are mounted on the toaster frame 15 for guiding the first and the rear sliding member 21, 12 to slide along the toaster frame 15 respectively. The toaster lid is coupled with the front and the rear sliding members 21, 12 in such a manner that the toaster lid is arranged to move between a closed position and an opened position, wherein in the closed position, the toaster lid is moved by the front and the rear sliding members 21, 12 to close the toaster slot, wherein in the opened position, the toaster lid is moved by the front and the rear sliding members 21, 12 to expose the toaster slot to an exterior of the toaster frame 15. On the other hand, the toaster frame 15 defines at least one toaster slot for selectively receiving the bread slice. The heating device is received in the toaster frame for toasting the bread slice when the bread slice is received in the toaster slot.

The lid arrangement further comprises an actuation mechanism which is supported by the toaster base 1, and comprises a rear electromagnetic frame 8, a rear biasing member 3, a first and a second rear driving member 5, 5a, a rear electromagnetic member 13 supported by the rear electromagnetic frame 8, a rear actuation handle 4 extended from the rear sliding member 12, a rear electromagnetic coil 14 mounted on a rear side of the toaster frame 15 and is aligned with the rear electromagnetic member 13, and a rear switch 2 mounted on the toaster frame 15 and is positioned below and aligned with the rear biasing member 3.

Alternatively, the lid arrangement further comprises a rear hanger frame 23, a rear biasing member 3, a first and a second rear driving member 5, 5a connected with the rear sliding member 12, and a rear actuation handle 4, a rear electromagnetic coil 18, a rear electromagnetic member 17 coupled with the rear electromagnetic coil 18, and a rear switch 2. Moreover, the rear electromagnetic member 17 has a rear hanging member 17-1 positioned below the rear hanger frame 23, whereas the rear switch 2 is mounted on the toaster frame 15 and is positioned below and aligned with the rear biasing member 3.

According to the preferred embodiment of the present invention, each of the sliding guiders 10 is embodied as a guiding shaft. Moreover, the lid arrangement further comprises a first and a second rear guiding frame 6, 6a having inwardly bent end portions 6-1, 6a-1 respectively (preferably at substantially ninety degrees), wherein each of the first and the second rear driving member 5, 5a has a corresponding upper end portion arranged to couple with the corresponding inwardly bent end portion 6-1, 6a-1 of the first and the second rear guiding frame 6, 6a respectively. The lid arrangement 10 may further comprise a plurality of sliding guiders 10, but in this preferred embodiment, the lid arrangement has the first and the second sliding guider 10 only.

Referring to FIG. 1 to FIG. 4 of the drawings, the bread toaster comprises the toaster frame 15, the toaster base 1, the heating device and the lid arrangement. The lid arrangement comprises the front sliding member 21 and the rear sliding member 12, a plurality of the front sliding guider 10 and the rear sliding guiders 10 slidably coupled with the front and the rear sliding member 21, 12 respectively, the toaster lid, and the front supporting frame 11a, and the rear supporting frame 11. The front and the rear sliding member 21, 12 are supported by the front supporting frame 11a and the rear supporting frame 11 respectively. The heating device comprises a control circuitry. Furthermore, the lid arrangement further comprises an actuation mechanism which is supported by the toaster base 1, and comprises a rear electromagnetic frame 8, a rear biasing member 3, a first and a second rear driving member 5, 5a, a rear electromagnetic member 13 supported by the front rear electromagnetic frame 8, a rear actuation handle 4 extended from the rear sliding member 12, a rear electromagnetic coil 14 mounted on a rear side of the toaster frame 15 and is aligned with the rear electromagnetic member 13, and a rear switch 2 mounted on the toaster frame 15 and is positioned below and aligned with the rear biasing member 3. Moreover, the lid arrangement further comprises the first and the second rear guiding frame 6, 6a having inwardly bent end portions 6-1, 6a-1 respectively, wherein each of the first and the second rear driving member 5, 5a has a corresponding upper end portion which is outwardly bent at substantially ninety degrees, and is arranged to couple with the corresponding inwardly bent end portion 6-1, 6a-1 of the first and the second rear guiding frame 6, 6a respectively. The lid arrangement further comprises a plurality of rear resilient element 7, 7a each having one end mounted on the rear supporting frame 11 and another end mounted to an upper end portion of the corresponding first and the second guiding frames 6, 6a. The lid arrangement further comprises a first and a second lid member 9, 9a, wherein the first and the second guiding frames 6, 6a are to the first and the second lid member 9, 9a respectively.

Figure 2:
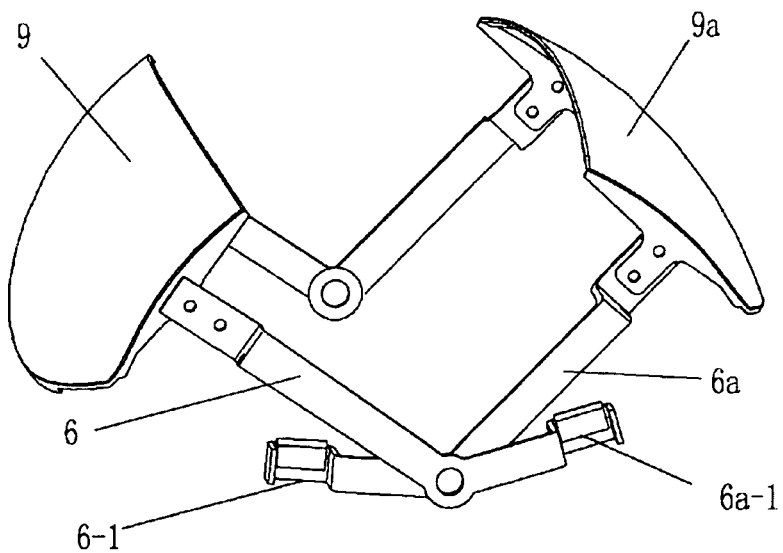
FIG. 2 is a perspective view of the lid arrangement of the bread toaster according to the above first preferred embodiment of the present invention.
Figure 3:
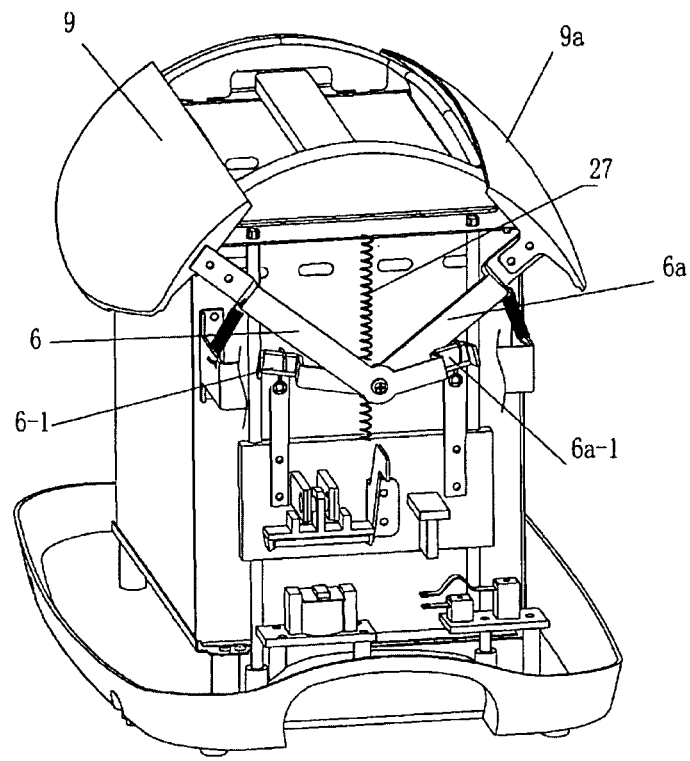
FIG. 3 is a schematic diagram of the lid arrangement of the bread toaster according to the above first preferred embodiment of the present invention.
Figure 4:
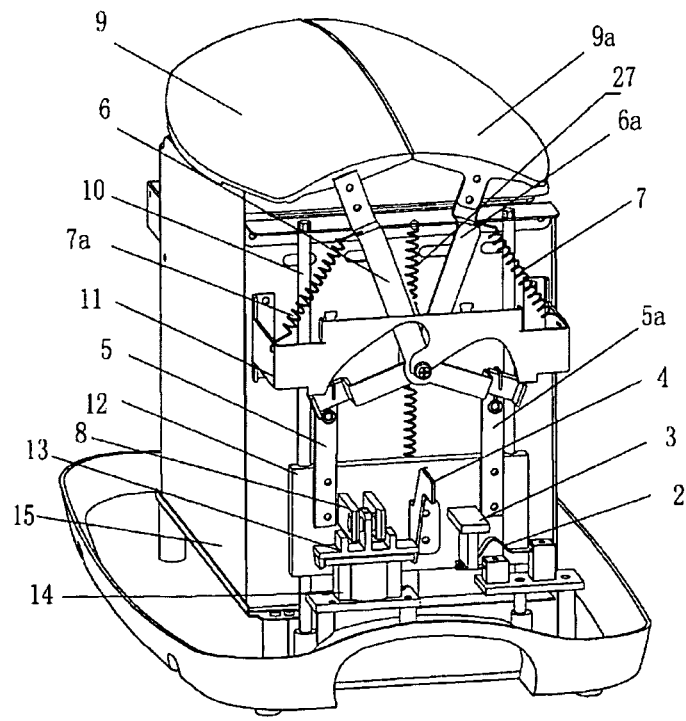
FIG. 4 is a perspective view of a bread toaster with a lid arrangement according to the above first preferred embodiment of the present invention, illustrating that the toaster lid is moved to a closed position.
Figure 5:
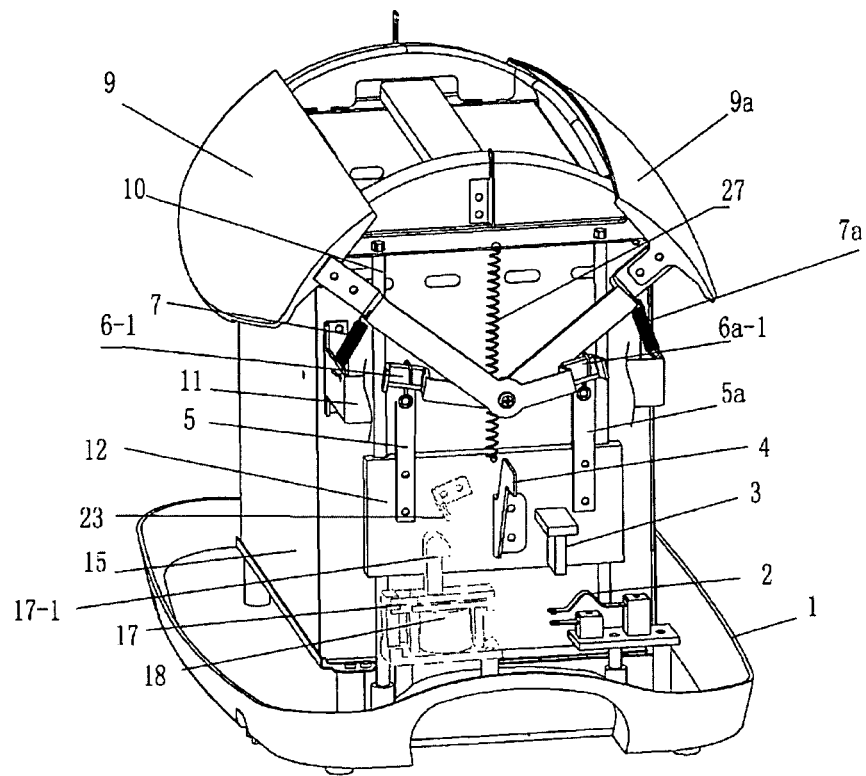
FIG. 5 is a perspective view of a bread toaster with a lid arrangement according to a second preferred embodiment of the present invention.
Figure 6:
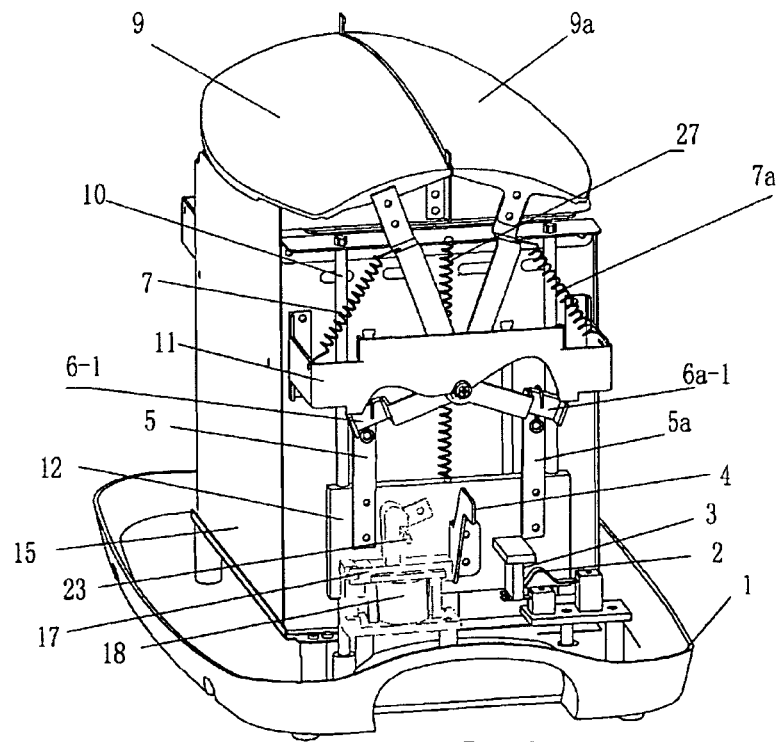
FIG. 6 is a perspective view of a bread toaster with a lid arrangement according to a second preferred embodiment of the present invention, illustrating that the toaster lid is moved to a closed position.

Referring to FIG. 5, FIG. 6 and FIG. 2 of the drawings, the bread toaster according to a second preferred embodiment of the present invention is illustrated. According to the second preferred embodiment, the bread toaster comprises a toaster frame 15, a toaster base 1, a heating device and also a lid arrangement. The lid arrangement comprises a front sliding member 21 and a rear sliding member 12, a plurality of front sliding guider 10 and rear sliding guiders 10 slidably coupled with the front and the rear sliding member 21, 12, a toaster lid, and a front supporting frame 11a, and a rear supporting frame 11. Moreover, the heating device also comprises a control circuitry. The lid arrangement further comprises a rear hanger frame 23, a rear biasing member 3, a first and a second rear driving member 5, 5a connected with the rear sliding member 12, and a front actuation handle 4. The lid arrangement further comprises the first and the second rear guiding frame 6, 6a having inwardly bent end portions 6-1, 6a-1 respectively, wherein each of the first and the second rear driving member 5, 5a has a corresponding upper end portion which is outwardly bent at substantially ninety degrees, and is arranged to couple with the corresponding inwardly bent end portion 6-1, 6a-1 of the first and the second rear guiding frame 6, 6a respectively. Furthermore, the lid arrangement further comprises an actuation mechanism which is supported by the toaster base 1, and comprises a front hanger frame 23, a rear biasing member 3, a front electromagnetic coil 18, a front electromagnetic member 17 coupled with the front electromagnetic coil 18, and a switch 2. Moreover, the rear electromagnetic member 17 has a rear hanging member 17-1 positioned below the rear hanger frame 23, whereas the rear switch 2 is mounted on the toaster frame 15 and is positioned below and aligned with the rear biasing member 3. The lid arrangement further comprises a plurality of rear resilient element 7, 7a each having one end mounted on the rear supporting frame 11 and another end mounted to an upper end portion of the corresponding first and the second rear guiding frames 6, 6a. The lid arrangement further comprises a first and a second front guiding frame 20, 20a, and a first and a second lid member 9, 9a, wherein the first and the second rear guiding frames 6, 6a are movably connected to the first and the second lid member 9, 9a respectively, while the first and the second front guiding frame 20, 20a are also movably connected to the first and the second lid member 9, 9a respectively, and are spaced apart from the first and the second rear guiding frame 6, 6a.

As shown in FIG. 3, FIG. 4, FIG. 8 and FIG. 9 of the drawings, when the bread toaster is connected to an external power source, a user can depress a front actuation handle 22 for depressing the front sliding member 21. When the front sliding member 21 is depressed, the front hanger frame 23 is depressed to connect with a front hanging member 17-1 of a front electromagnetic member 17. A front biasing member 24 is extended from the front sliding member 21 and is arranged to actuate a switcher member 25 of the switch 19. When the switch 19 is actuated, the heating device is also actuated for toasting a bread slice. When the user wishes to close the toasting slot, he or she needs to manually actuate the rear actuation handle 4 for depressing the rear sliding member 12. This depressing movement of the rear actuation handle 4 induces pivotal movements of the first and the second rear guiding frame 6, 6a and the first and the second rear driving member 5, 5a for pivotally moving the lid members 9, 9a to close the toasting slot, and this mechanism brings the toaster lid to move to the closed position. When the lid arrangement is at the closed position, the rear electromagnetic member 13 is arranged to be attracted to be in contact with the rear electromagnetic coil 14 while the rear biasing member 3 is in contact with the rear switch 2, which delivers a signal to the heating device for it to adjust a predetermined toasting time which corresponds to a condition in which the bread slice is toasted with the lid members 9, 9a closed. When the predetermined toasting time has passed, the control circuitry is arranged to deliver a deactivation signal (such as a predetermined electric level) for deactivating the rear electromagnetic coil 14. The lid arrangement further comprises a rear elastic element 27 mounted on the toaster frame 15 for normally exerting an upward urging force to the rear sliding member. Thus, when the attractive force ceases to exist, the rear sliding member 12 is arranged to be driven to move upwardly. This upward motion on the part of the rear sliding member 12 induce a corresponding pivotal movement on the part of the first and the second rear guiding frames 6, 6a, and the first and the second rear driving member 5, 5a for pivotally opening the lid member 9, 9a from the closed position of the lid arrangement through the resilient force exerted by the resilient element 7, 7a. At the same time, the control circuitry also sends a deactivation signal to the front electromagnetic coil 18 so that the attractive force between the front electromagnetic coil 18 and the front electromagnetic member 17 ceases to exist. The lid arrangement further comprises a front elastic element 26 mounted on the toaster frame 15 for normally exerting an upward urging force to the front sliding member 21. The front sliding member 21 will then upwardly deliver the bread slice for user's consumption.

Referring to FIG. 5, FIG. 6, FIG. 8 and FIG. 9 of the drawings, when the bread toaster is connected to an external power source, a user can depress a front actuation handle 22 for depressing the front sliding member 21. When the front sliding member 21 is depressed, the front hanger frame 23 is depressed to connect with a front hanging member 17-1 of a front electromagnetic member 17. The heating device will be activated for toasting the bread slice in the toasting slot. When the user wishes to close the toasting slot, he or she needs to manually actuate the rear actuation handle 4 for depressing the rear sliding member 12. This depressing movement of the rear actuation handle 4 induces pivotal movements of the first and the second rear guiding frame 6, 6a and the first and the second rear driving member 5, 5a for pivotally moving the lid members 9, 9a to close the toasting slot, and this mechanism brings the toaster lid to move to the closed position. At this time, the rear hanger frame 23 and the rear biasing member 3 is depressed to bias against the rear switch 2, which is arranged to deliver a signal to the heating device that the lid members 9, 9a are now closed. The heating device is than arranged to toast the bread slice for a predetermined period of time. The heating device is then arranged to deliver current to the rear electromagnetic coil 18 for generating an attractive force toward the rear electromagnetic member 17 for maintaining the rear sliding member 12 at the depressed or downward position with respect to the toaster frame 15. When the predetermined toasting time has passed, the control circuitry is arranged to deliver a deactivation signal (such as a predetermined electric level) for deactivating the rear electromagnetic coil 18. The lid arrangement further comprises a rear elastic element 27 mounted on the toaster frame 15 for normally exerting an upward urging force to the rear sliding member 12. Thus, when the attractive force ceases to exist, the rear sliding member 12 is arranged to be driven to move upwardly. This upward motion on the part of the rear sliding member 12 induce a corresponding pivotal movement on the part of the first and the second rear guiding frames 6, 6a, and the first and the second rear driving member 5, 5a for pivotally opening the lid member 9, 9a from the closed position of the lid arrangement through the resilient force exerted by the resilient element 7, 7a. At the same time, the control circuitry also sends a deactivation signal to the front electromagnetic coil 18 so that the attractive force between the front electromagnetic coil 18 and the front electromagnetic member 17 ceases to exist. The lid arrangement further comprises a front elastic element 26 mounted on the toaster frame 15 for normally exerting an upward urging force to the front sliding member 21. The front sliding member 21 will then upwardly deliver the bread slice for user's consumption.

Figure 7:
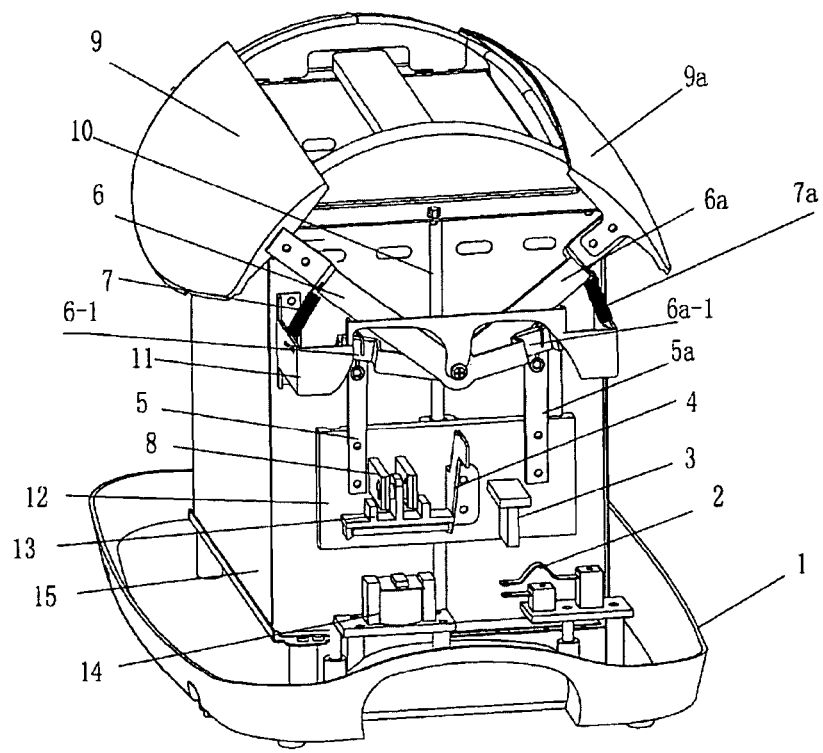
FIG. 7 is a perspective view of a rear side of the bread toaster according to the above second preferred embodiment of the present invention.
Figure 8:
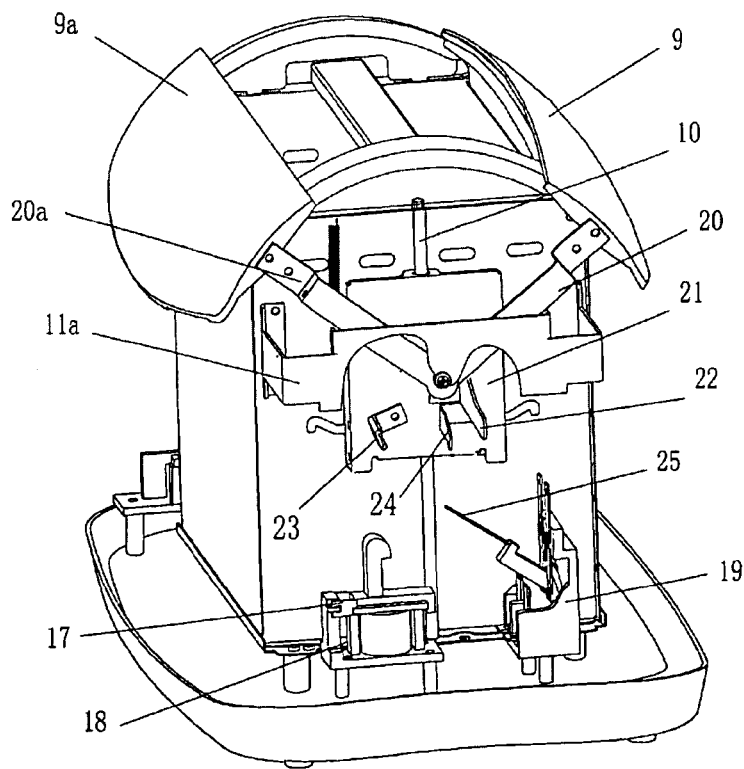
FIG. 8 is a front view of the bread toaster according to above second preferred embodiment of the present invention.
Figure 9:
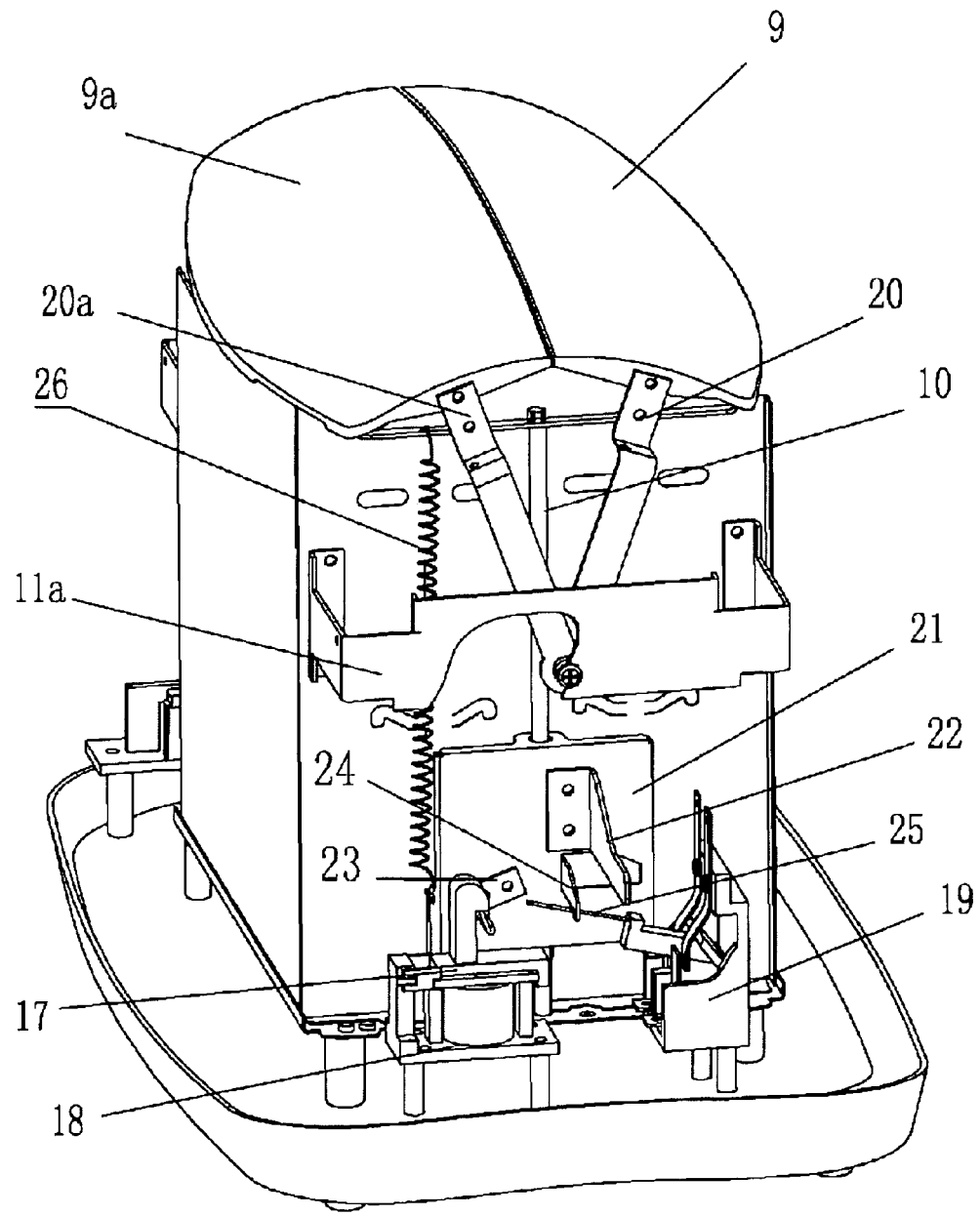
FIG. 9 is a schematic diagram of the bread toaster according to above second preferred embodiment of the present invention.

Referring to FIG. 7 of the drawings, the rear sliding guider 10 is provided is slidably mounted to the rear sliding member 12 so that the rear sliding member 12 is capable of sliding along a vertical direction of the toaster frame 15. The toaster frame 15 may have three to four rear sliding guiders 10, yet the preferred number of the rear sliding guiders 10 is two.

Figure 10:
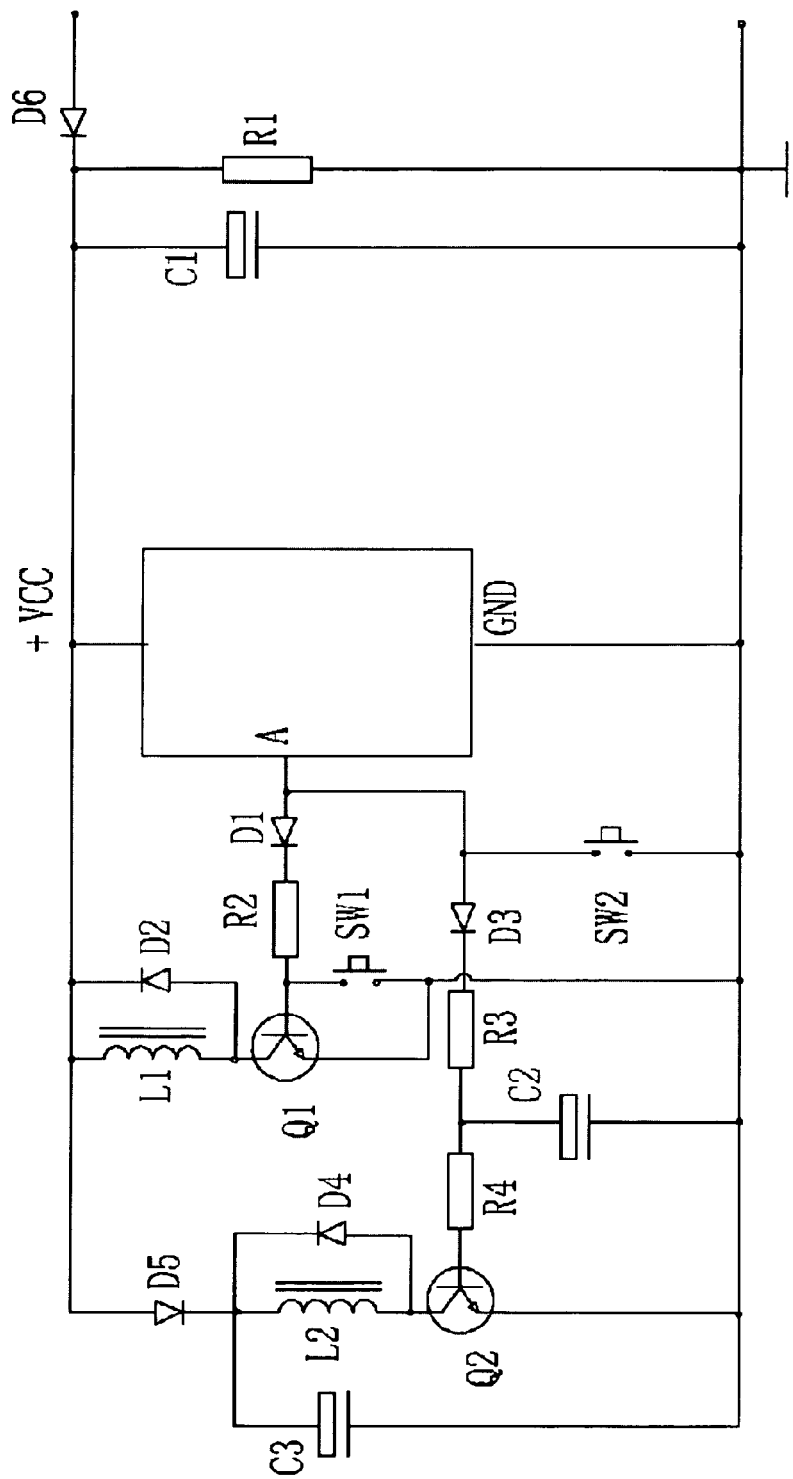
FIG. 10 is a first circuit diagram of the bread toaster according to above second preferred embodiment of the present invention.

Referring to FIG. 10 of the drawings, the control circuitry of the heating device comprises a timer sub-circuitry and means for controlling (controlling means) an operation of the lid arrangement. The controlling means comprises a first diode D1 having a positive terminal connected to an output terminal A of the timer circuitry, a first transistor Q1, a first switch SW1, and a second resistor R2, wherein a negative terminal of the first diode D1 is connected to the first switch SW1 and to the base of the first transistor Q1 through the second resistor R2. Furthermore, the controlling means further comprises a second diode D2 and a first inducting device L1, wherein the first switch SW1 is also electrically connected to the emitter of the first transistor Q1, and the collector of the first transistor Q1 is electrically connected to the positive terminal of the second diode D2 and the first inducting device L1, which is also electrically connected to the negative terminal of the second diode D2 and the power source VCC of the control circuitry. The controlling means further comprises a second switch SW2, a third resistor R3, a fourth resistor R4, a second capacitor C2, a third diode D3 having a positive terminal electrically connected to the output terminal A of the timer circuitry, the positive terminal of the first diode D1, and the second switch SW2, and a negative terminal electrically connected to the third resistor R3, the fourth resistor R4 and a positive terminal of the second capacitor C2. The controlling means further comprises a second transistor Q2 having a base electrically connected to the fourth resistor R4, wherein a negative terminal of the second capacitor C2 is electrically connected to the emitter of the second transistor Q2. The controlling means further comprises a second inducting device L2 and a fourth diode D4, wherein a collector of the second transistor Q2 is electrically connected to the second inducting device L2 and a positive terminal of the fourth diode D4. The controller means further comprises a third capacitor C3, and a fifth diode D5, wherein a positive terminal of the fourth diode D4 is electrically connected to the positive terminal of the third capacitor C3 and the second inducting device L2. A negative terminal of the fourth diode D4 is electrically connected with a negative terminal of the fifth diode D5. A negative terminal of the third capacitor C3 is electrically connected to the ground, while a positive terminal of the fifth diode D5 is electrically connected to the power source VCC.

Figure 11:
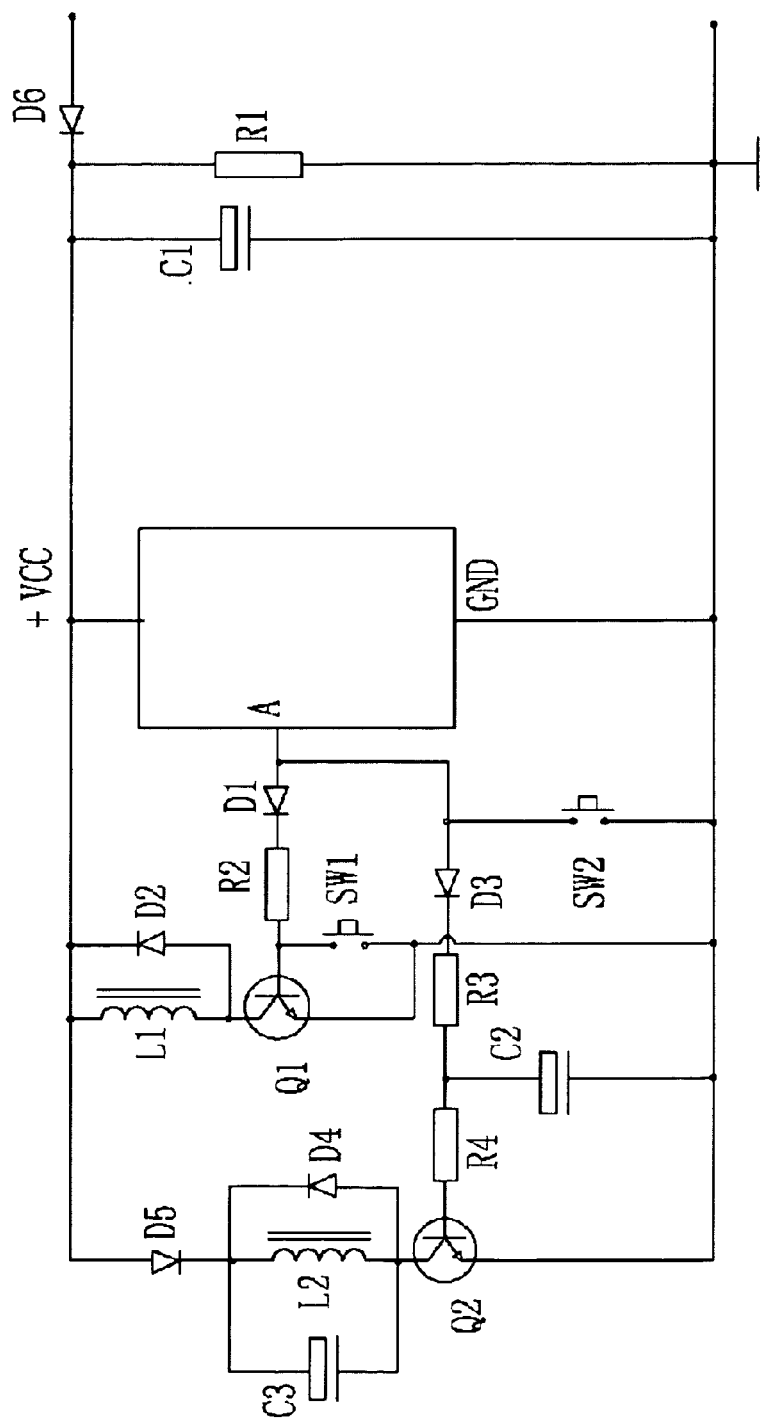
FIG. 11 is a second circuit diagram of the bread toaster according to above second preferred embodiment of the present invention.

Referring to FIG. 11 of the drawings, the controlling means further comprises a first diode D1, wherein a positive terminal of the third diode D3 is electrically connected to the output terminal A of the timer circuitry, a positive terminal of the first diode D1 and the first switch SW1. A negative terminal of the third diode D3 is electrically connected to the third resistor R3, the fourth resistor R4, and a positive terminal of the second capacitor C2. The second switch SW2 is also connected to the ground. The fourth resistor R4 is also electrically connected to the base of the second transistor Q2. A negative terminal of the second capacitor C2 is electrically connected to the emitter of the second transistor Q2, whereas the collector of the second transistor Q2 is electrically connected to the negative terminal of the third capacitor C3, the second inducting device L2 and the positive terminal of the fourth diode D4. A positive terminal of the third capacitor C3, the second inducting device L2 and a negative terminal of the fourth diode D4 are connected to a negative terminal of the fifth diode D5, whereas the positive terminal of the fifth diode D5 is electrically connected to the power source VCC.

Referring to FIG. 10 to FIG. 11 of the drawings, the first diode D1 and third diode D3 preferably utilize 1N4148, 1N4001, 1N4005 or 1N4007 type diode, while the second diode D2 utilizes 1N4001, 4005 or 4007 type, and the second resistor R2 preferably has a resistance of 1K$\Omega$ to 3K$\Omega$. The first switch SW1 preferably utilizes A06-A-4.0 type or A06-A-5.0 type. The first transistor Q1 preferably utilizes 8050 or 9014 type, while the second diode D2 utilizes 1N4001, 1N4005 or 1N4007 type. The second switch SW2 preferably utilizes A06-A-4.0 or A06-A-5.0 type. The third resistor R3 preferably has a resistance of 1K$\Omega$ to 3K$\Omega$. The fourth resistor R4 preferably has a resistance of 0.5$\Omega$ to 3$\Omega$. The second capacitor C2 preferably has the range of 47 UF/16V to 470 UF/16V, while the second transistor Q2 utilizes 8050 or 9014 type. The third capacitor C3 preferably has the range of 470 UF/16V to 2000 UF/16V or 470 UF/25V to 2000 UF/25V. The first and the second inducting device L1, L2 has the value of 60$\Omega$/800 coils to 250$\Omega$/3000 coils. The fourth diode D4 and the fifth diode D5 utilize 1N4001, 1N4005 or 1N4007 type.

The operation of the present invention is as follows: when a user wishes to toast bread slice, he or she may depress the front actuation handle 22 for depressing the front sliding member 21 so as to actuate the switch 19. When the controlling means is switched on, the timer circuitry is arranged to deliver a predetermined voltage level to the first and the second transistor Q1, Q2. The first and the second inducting device L1 and L2 will then generate attractive force for maintaining the front actuation handle 22 at the depressed position. When the user wishes to toast the bread slice with the lid members 9, 9a covering the toasting slot, he or she has to actuation the rear actuation handle 4 for depressing the rear sliding member 12. This pivotally moves the lid members 9, 9a to cover the toasting slot. At this condition, the attractive force generated by the first and the second inducting device L1, L2 continues keeping the rear sliding member 12 at the depressed position. At the same time, the third capacitor C3 is being charged by the power source VCC through the fifth diode D5, while the second capacitor C2 is also charged by the power from the power source VCC through the third diode D3 and the third resistor R3. When the predetermined time for toasting the bread slice has passed, the timer circuitry is arranged to output a relatively low voltage level at the output terminal A for blocking electricity conduction at the first transistor Q1. The first inducting device L1 will lose the attractive force so that the rear sliding member 12 is pushed upwardly by the normal urging force exerted by the rear elastic element 27. When the rear sliding member 12 is pushed upwardly, the first and the second rear driving member 5, 5a and the first and second rear guiding frame 6, 6a will actuate opening of the lid members 9, 9a through the rear resilient elements 7, 7a. At this time, the voltage at the second capacitor C2 remain largely constant, and the second transistor Q2 is kept at conductive state (i.e. having a substantial voltage output). Since the second capacitor C2 is connected to the ground through the fourth resistor R4, when the second capacitor C2 completes discharging, the second transistor Q2 ceases to be conductive (i.e. no voltage output), the attractive force of the second inducting device L2 ceases to exist. Thus, the front sliding member 21 is pushed upwardly by the normal urging force from the front elastic element 26 as mentioned above.

When the bread toaster is toasting a bread slice, the user may actuation the first switch SW1 for allowing the first transistor Q1 to cut off voltage output. This attractive force of the first inducting device L1 ceases to exist and the lid members 9, 9a will be opened in a manner mentioned above.

When the user of the bread toaster needs to stop its operation, he or she can simply switch off the second switch SW2 for immediately cutting off the conductive state of the first transistor Q1. The attractive force of the first inducting device L1 ceases to exist, and the lid members 9, 9a will be opened in a manner as described above. At the same time, the voltage at the second capacitor C2 remain largely constant, and the second transistor Q2 is kept at conductive state (i.e. having a substantial voltage output). Since the second capacitor C2 is connected to the ground through the fourth resistor R4, when the second capacitor C2 completes discharging, the second transistor Q2 ceases to be conductive (i.e. no voltage output), the attractive force of the second inducting device L2 ceases to exist. Thus, the front sliding member 21 is pushed upwardly by the normal urging force from the front elastic element 26 as mentioned above.

When the electricity supply to the bread toaster accidentally stops, the first transistor Q1 stops working, and this makes the first inductive device L1 loses its attractive force. Then, the rear sliding member 12 is pushed upwardly by the normal urging force exerted by the rear elastic element 27 and the lid members 9, 9a will open as described above. At this time, the second and the third capacitor C2, C3 will still have a small amount of electric charge stored therein. When they are discharging, the attractive force of the second inducting device L2 will become smaller and when the normal urging force exerted by the front elastic element 26 is larger than the attractive force, the front sliding member 21 will move upwardly as described above.

What is claimed is:

1. A bread toaster for toasting at least one bread slice, comprising:

a toaster frame which defines at least one toaster slot for receiving said bread slice;

a heating device which is received in said toaster frame for toasting said bread slice when said bread slice is received in said toaster slot; and a lid arrangement which comprises front and rear sliding members movably mounted on said toaster frame, a plurality of sliding guiders mounted on said toaster frame for guiding said front and rear sliding members to slide along said toaster frame respectively, and a toaster lid coupled with said rear sliding member to move between a closed position and an opened position, wherein in said closed position, said toaster lid is moved to cover and to close said toaster slot, wherein in said opened position, said toaster lid is moved to expose said toaster slot to an exterior of said toaster, wherein said front sliding member is upwardly moved for delivering said bread slice from said toaster slot after said bread slice is toasted, wherein said lid arrangement further comprises a rear electromagnetic frame, a rear biasing member, first and second rear driving members connected with said rear sliding member, a rear electromagnetic member supported by said rear electromagnetic frame, a rear actuation handle extended from said rear sliding member, a rear electromagnetic coil mounted on a rear side of said toaster frame and is aligned with said rear electromagnetic member, and a rear switch mounted on said toaster frame and is positioned below and aligned with said rear biasing member, wherein in said closed position, said rear electromagnetic member is attracted to be in contact with said rear electromagnetic coil while said rear biasing member is in contact with said rear switch which delivers a signal to said heating device to adjust a predetermined toasting time corresponding to a condition in which said bread slice is toasted with said toaster lid being closed, wherein said lid arrangement further comprises a front hanger frame, a front biasing member, a front actuation handle, a front electromagnetic coil, a front electromagnetic member coupled with said front electromagnetic coil, a front hanging member positioned below said front hanger frame, and a switch, wherein when said front actuation handle is depressed for depressing said front sliding member, said front hanger frame is depressed to connect with said front hanging member, wherein said front biasing member, which is extended from said front sliding member, is arranged to actuate said switch so as to activate said heating device for toasting said bread slice.

2. A bread toaster for toasting at least one bread slice, comprising:

a toaster frame which defines at least one toaster slot for receiving said bread slice;

a heating device which is received in said toaster frame for toasting said bread slice when said bread slice is received in said toaster slot; and a lid arrangement which comprises front and rear sliding members movably mounted on said toaster frame, a plurality of sliding guiders mounted on said toaster frame for guiding said front and rear sliding members to slide along said toaster frame respectively, and a toaster lid coupled with said rear sliding member to move between a closed position and an opened position, wherein in said closed position, said toaster lid is moved to cover and to close said toaster slot, wherein in said opened position, said toaster lid is moved to expose said toaster slot to an exterior of said toaster, wherein said front sliding member is upwardly moved for delivering said bread slice from said toaster slot after said bread slice is toasted, wherein said lid arrangement further comprises a rear electromagnetic frame, a rear biasing member, first and second rear driving members connected with said rear sliding member, a rear electromagnetic member supported by said rear electromagnetic frame, a rear actuation handle extended from said rear sliding member, a rear electromagnetic coil mounted on a rear side of said toaster frame and is aligned with said rear electromagnetic member, and a rear switch mounted on said toaster frame and is positioned below and aligned with said rear biasing member, wherein in said closed position, said rear electromagnetic member is attracted to be in contact with said rear electromagnetic coil while said rear biasing member is in contact with said rear switch which delivers a signal to said heating device to adjust a predetermined toasting time corresponding to a condition in which said bread slice is toasted with said toaster lid being closed, wherein each of said sliding guiders comprises a guiding shaft, wherein said lid arrangement further comprises first and second rear guiding frames each having an inwardly bent end portion, wherein each of said first and second rear driving members has an upper end portion coupled with said inwardly bent end portions of said first and second rear guiding frames respectively, wherein said toast lid comprises first and second lid members, wherein said first and second rear guiding frames are movably connected to said first and second lid members respectively.

3. The bread toaster, as recited in claim 1, wherein each of said sliding guiders comprises a guiding shaft, wherein said lid arrangement further comprises first and second rear guiding frames each having an inwardly bent end portion, wherein each of said first and second rear driving members has an upper end portion coupled with said inwardly bent end portions of said first and second rear guiding frames respectively, wherein said toast lid comprises first and second lid members, wherein said first and second rear guiding frames are movably connected to said first and second lid members respectively.

4. The bread toaster, as recited in claim 3, wherein said lid arrangement comprises four said sliding guiders.

* * * * *